(12) United States Patent
Fava et al.

(10) Patent No.: US 10,792,611 B2
(45) Date of Patent: Oct. 6, 2020

(54) AIR PURIFICATION DEVICE AND PROCESS

(71) Applicant: UNIVERSITA' POLITECNICA DELLE MARCHE, Ancona (IT)

(72) Inventors: Gabriele Fava, Ancona (IT); Mattia Pierpaoli, Ancona (IT)

(73) Assignee: UNIVERSITA' POLITECNICA DELLE MARCHE, Ancona (IT)

( * ) Notice: Subject to any disclaimer, the term of this patent is extended or adjusted under 35 U.S.C. 154(b) by 312 days.

(21) Appl. No.: 15/759,317

(22) PCT Filed: Sep. 16, 2016

(86) PCT No.: PCT/IT2016/000214
§ 371 (c)(1),
(2) Date: Mar. 12, 2018

(87) PCT Pub. No.: WO2017/046825
PCT Pub. Date: Mar. 23, 2017

(65) Prior Publication Data
US 2018/0185785 A1     Jul. 5, 2018

(30) Foreign Application Priority Data

Sep. 17, 2015    (IT) ........................ 102015000052698

(51) Int. Cl.
| | |
|---|---|
| *B01D 50/00* | (2006.01) |
| *B01D 53/02* | (2006.01) |
| *B01D 53/32* | (2006.01) |
| *B01D 53/88* | (2006.01) |

(52) U.S. Cl.
CPC ......... *B01D 53/323* (2013.01); *B01D 53/885* (2013.01); *B01D 2253/102* (2013.01); *B01D 2255/20707* (2013.01); *B01D 2255/802* (2013.01); *B01D 2257/106* (2013.01); *B01D 2257/404* (2013.01); *B01D 2257/502* (2013.01); *B01D 2257/708* (2013.01); *B01D 2257/7027* (2013.01); *B01D 2258/06* (2013.01); *B01D 2259/80* (2013.01); *B01D 2259/804* (2013.01)

(58) Field of Classification Search
CPC ..... A61L 9/00; A61L 9/18; A61L 9/20; A61L 9/205
USPC .......... 422/4–5, 122, 186.3; 55/315; 96/108, 96/223–224
See application file for complete search history.

(56) References Cited

U.S. PATENT DOCUMENTS

2009/0010801 A1\*   1/2009   Murphy ................. B03C 3/017
                                                                      422/4

\* cited by examiner

*Primary Examiner* — Monzer R Chorbaji
(74) *Attorney, Agent, or Firm* — Egbert, McDaniel & Swartz, PLLC

(57) ABSTRACT

A device and a process used to purify air from pollutants are disclosed. The device has at least one empty body defining a chamber intended to receive an air flow to be purified and having at least one inlet hole for the air, and at least one outlet hole for the air. The chamber has an electric field generator, at least one photocatalyst, intended to be excited by a luminous radiation, implementing a photocatalysis process, at least one luminous radiation source intended to excite the photocatalyst, and at least one adsorbing material. The electric field generator, the at least one photocatalyst and the at least one adsorbing material are disposed in the chamber in such manner to cooperate.

5 Claims, 4 Drawing Sheets

AIR PURIFICATION DEVICE AND PROCESS

FIELD OF THE INVENTION

The present invention relates to an air purification device and process. In particular, the present invention relates to a device that is capable of adsorbing, oxidizing and eliminating practically all pollutants that are generally contained in the air in enclosed spaces.

THE PRIOR ART

The air of enclosed spaces may contain traces of pollutants of different type, for example dust (PM2.5, PM1.0), smoke, and smog, including chemical or biological contaminants.

In particular, the gaseous pollutants that can be found in the air of indoor spaces include carbon monoxide, nitrogen oxides (NO, NO2), ozone, volatile organic compounds (VOC) such as, for example, monocyclic aromatic compounds (toluene and other BETXS), aldehydes and ketones (formaldehyde, acetaldehyde, acetone, ethyl methyl ketone).

All these pollutants affect the occupants of the spaces with contaminated air at different levels. Effects may vary according to the type and concentration of pollutants, as well as according to exposure time, ranging from the simple sensation of the so-called "foul air" to mucosa irritation or allergic reactions. Moreover, a long exposure to especially harmful pollutants might generate pathologies in individuals attending spaces with contaminated air.

Several air purification techniques have been developed to solve these problems.

A first example of the prior art in the field of air purification is active carbon filtration.

Such a technique basically consists in making an air current pass through a filter that contains active carbon; because of its porosity, active carbon is capable of adsorbing the majority of pollutants, in particular organic pollutants. This type of active carbon filtration is essentially based on a "physical" action of the filter, wherein by flowing inside the filter, the air passes through the active carbon, which in turn traps the pollutants particles thanks to its porosity.

However, such a type of filtration is impaired or prohibited in presence of solid particles having micrometric dimensions that reduce the porosity and the total exchange surface of the pores of the active carbons.

Moreover, it is necessary to remove the pollutants adsorbed by the active carbons cyclically in order to "regenerate" them and make them usable again. The pollutants removed from the active carbons must be suitably disposed of. The regeneration process of the active carbons and the disposal of the eliminated pollutants involve a significant energy waste and high costs.

Although active carbon filters can be regenerated, they get "exhausted" after some filtering and regeneration cycles. When they are exhausted, the filters must be replaced with new filters.

Another air purification technique of the prior art is the so-called electrofiltration or electrostatic precipitation.

Such a technique allows for separating solid particles or liquid drops suspended in the air. It is based on the passage of the air through a non-uniform electric field.

The device used to implement such a technique, which is known as electrostatic filter (or electrofilter), generates a potential difference between two electrodes (typically indicated as discharge electrode and collecting electrode) disposed one in front of the other, in order to create an intense electric field. An emission of electrical charges is created around the discharge electrode, which is able to ionize also the carrier gas for the "avalanche effect". The air flow (or carrier gas) that passes through the electrodes is ionized, generating the "electric wind", that is to say a flow of ions (electric charges) that move in the direction of the electrode with opposite sign.

By migrating, the ions collide with the pollutants particles contained in the air, which are electrically charged by impact or by absorption, increasing their electrical charge density. The intensely charged particles are efficaciously attracted towards the collecting electrode where they are held.

A problem of the electrostatic filters of known type are the significant dimensions and, most of all, the fact that the electrostatic filtration process generates high levels of irritating compounds, such as ozone and nitrogen oxides.

Another air purification technique of the prior art is photocatalysis.

Photocatalysis is based on the presence of a material, known as photocatalyst, that changes its energy structure when stimulated by the light at a suitable wavelength, generating the electron/hole pair on the material surface. The "activated" photocatalyst is capable of triggering reactions that result in the oxidation of the pollutants particles. Therefore, the photocatalytic processes allow eliminating the polluting compounds, for example organic pollutants, through their mineralization (that is to say, their transformation into non-harmful compounds such as for example $CO_2$ and $H_2O$).

However, reaction intermediates that are harmful for human health may be formed during the photocatalytic oxidation process.

Devices that combine the aforementioned techniques are known, which implement consecutive filtration steps, each step consisting in the specific selected technique. The purification system composed of individual processes in series is configured as a series of consecutive treatments, for example of an air flow, which are substantially independent one from another.

The purpose of the present invention is to disclose an air purification device and process that overcome the limitations contained in the techniques of the prior art and increase the efficacy promoting positive synergies.

Another purpose of the present invention is to disclose a device that provides for the combined use of different air purification techniques.

Another purpose of the present invention is to disclose a device and a process that combine a high purification efficacy, with the reduced production, and consequent reduced release in the air of compounds that are potentially harmful for human health.

An additional purpose of the present invention is to disclose a high-efficiency device for purifying the air in enclosed spaces.

A further purpose of the present invention is to disclose an air purification device and process through the combined action of multiple different techniques.

DESCRIPTION OF THE INVENTION

The aforementioned purposes and other purposes that will be clarified in the following description are achieved by the present invention, which relates to a device for purifying the air from pollutants, comprising at least one empty body, having at least one inlet hole for the air, at least one outlet hole for the air, and defining a chamber intended to receive an air flow to be purified. The chamber comprises means for generating an electric field, at least one photocatalyst, intended to be excited by a luminous radiation, implementing a photocatalysis, at least one luminous radiation source intended to excite said photocatalyst, and at least one adsorbing material (for example a material comprising active carbon).

The means for generating an electrical field, the photocatalyst and the adsorbing material are disposed in the chamber in such manner to cooperate.

The applicant has surprisingly noted that, permitting the simultaneous use of multiple air purification techniques, that is to say electrostatic precipitation, photocatalysis and adsorption on adsorbing material, such a device allows the three techniques to cooperate synergistically.

The photocatalysis mentioned in this invention is preferably a heterogeneous photocatalysis, that is to say a type of photocatalysis wherein the photocatalyst and the reactant are in two different phases. For example, the photocatalyst is a solid, whereas the reactant is a fluid (such in the case of the present invention).

In particular, the three different technologies cooperate actively, in a combined synergetic way, combining the different effects of the three physical-chemical processes (that is to say photocatalysis, adsorption and electrostatic precipitation), for example inside a single chamber of a device according to the invention.

The action and the simultaneous implementation of the three techniques produces a synergetic effect that increments the benefits and limits the defects of all three technologies involved in air purification from pollutants.

According to the present invention, the means for generating an electric field, at least one photocatalyst and at least one adsorbing material are disposed inside the chamber of the purification device at a reduced distance, that is to say at such a distance that the benefits of the electrostatic precipitation, of the photocatalysis and of the adsorption are mutually integrated.

Otherwise said, for example, the electric field encounters the photocatalyst that, being activated by a suitable luminous source, can produce oxidation reactions (for example of polluting compounds) at adsorbing material level.

The presence of the three elements (that is to say, the means for generating an electric field, the photocatalyst and the adsorbing material) positioned in the chamber inside the device of the invention in adjacent position, and the consequent synergetic action of the three components allow for achieving a better air purification from pollutants compared to the devices of the prior art.

According to an embodiment of the present invention, the device contains at least one plane, which is perpendicular to the incoming air flow, that intercepts the electric field, the photocatalyst and the adsorbing material. According to an embodiment of the present invention, the three elements (that is to say the means for generating an electric field, the photocatalyst and the adsorbing material) are disposed in such manner to substantially operate in parallel, that is to say in a single air purification step, unlike the embodiments of the prior art wherein the purification elements are disposed in series in such manner to implement air purification in consecutive steps, i.e. substantially in series.

According to an embodiment of the present invention, the electrical field, at least one photocatalyst and at least one adsorbing material operate simultaneously for purifying said air flow.

The expression "operate simultaneously" indicates that the three elements contained inside the body of the device operate in such manner that at least part of the air contained inside the chamber is simultaneously subject to the action of the electric field, to the action of the photocatalyst (i.e. to photocatalysis) and to the action of adsorption (by the adsorbing material), at least for part of its permanence inside the chamber. As already mentioned, in addition to operating directly at air level, the three actions mutually interact, implementing their benefits and efficacy.

For example, according to an embodiment of the present device, at least one adsorbing material is subject to an electric field and a photocatalysis.

It must be noted that the term "photocatalyst" indicates at least one material having at least photocatalytic properties, that is to say able to generate a photocatalysis process when subject to luminous radiation. According to an advantageous embodiment of the present invention, the photocatalyst can also have adsorbing and/or conductive properties. According to a possible embodiment, at least one material disposed inside the device is a photocatalytic material and another material is an adsorbing material. It must be also noted that according to an advantageous embodiment of the present invention, the photocatalyst comprises a composite material with photocatalytic and adsorbing properties.

For example, the photocatalytic material (which may comprise titanium dioxide, as illustrated below) is applied on an adsorbing material (which may comprise active carbons) in such manner to form a composite material with photocatalytic and adsorbing properties.

With the presence of the adsorbing material, and in particular with the presence of a photocatalytic material applied on the adsorbing material, the synergies of the present device are additionally increased because, in addition to the photocatalytic action on pollutants contained in the air, and on those, for example, adsorbed at adsorbing material level, after being suitably "activated" by the exposure to a luminous radiation, the photocatalyst is capable of triggering reactions that will cause the oxidation of the pollutants particles contained in the air and at adsorbing material level. Because of the photocatalytic action, the photocatalytic and adsorbing materials, preferably forming a composite material, mineralize and destroy the pollutants, while regenerating. As mentioned above, because of the proximity of the photocatalyst with respect to the adsorbing material, a photocatalytic action is also exerted at said adsorbing material level. In view of the above, that is to say by eliminating the pollutants contained in the adsorbing material, also the adsorbing material is regenerated by means of the photocatalysis.

According to a preferred embodiment, at least one photocatalyst comprises $TiO_2$ (titanium dioxide).

Titanium dioxide ($TiO_2$) is a preferred material because, in addition to being a photocatalytic material, it also has reactive properties with ozone. In particular, it must be noted that $TiO_2$ can reduce the presence of ozone when activated by a luminous radiation.

According to a preferred embodiment of the device of the invention, the means for generating an electric field comprise at least one first electrode and one second electrode.

Specifically, the means for generating an electric field contained in the device generate an electric field that permits the electrostatic precipitation (or electrofiltration) of the pollutants contained in the air to be purified.

In order to implement such a technique, a potential difference is generated between the two electrodes.

In particular, one electrode acts as "discharge" electrode (for example the first electrode), and the second electrode acts as "collecting" electrode.

The discharge electrode is the electrode whereon an electric potential is applied, whereas the collecting electrode is the electrode towards which the pollutants particles subject to electrofiltration are addressed, thus being separating from the air flow.

According to an embodiment of the present invention, the device also comprises a conductive material. For example, the at least one photocatalyst comprises a composite material with conductive properties, or the photocatalyst is disposed on at least one conductive element.

For example, a conductive material can be applied on at least part of an adsorbing material (for example in such manner to form a composite material with conductive properties), or at least part of the adsorbing material and/or the photocatalytic material can be disposed on a conductive element, for example an electrode (comprising for example a plate of metallic material). Other embodiments of the invention are possible, wherein the photocatalytic material is applied on a conductive material and/or on an adsorbing material.

Advantageously, in addition to the aforementioned effects, with reference to a photocatalytic and adsorbing material, if a material with conductive properties is used, it will be also possible to have a material able to cooperate in the generation of an electric field according to the present invention. According to a possible embodiment of the present invention, the adsorbing material and/or the photocatalytic material (for example forming a composite material) can be the collecting electrode (that is to say the second electrode). Additionally, or alternately, the photocatalytic material and/or the adsorbing material can be positioned on a support element that acts as electrode, for example made of metal (such as for example a metal plate). The other electrode of the electrofilter (discharge electrode) is normally a metal wire.

Because of the provision of a photocatalyst, such electrofilter is structured in such a way that, in addition to electrofiltering the pollutants contained in the air, it also combines the actions and the effects of the electroprecipitation with the ones of the photocatalytic action of the photocatalyst.

According to a preferred embodiment of the present invention, at least part of at least an adsorbing material is disposed in substantially radial configuration with respect to the direction of the air flow introduced in the empty body of the device of the invention. It must be noted that if the photocatalytic material and/or the conductive material are applied on the adsorbing material, the application may take place only on part of the material, with an additional portion of the adsorbing material devoid of the photocatalytic material and/or the conductive material, preferably disposed radially with respect to the air flow. According to a possible embodiment, a first adsorbing material may be used to apply photocatalytic material and/or a conductive material (eventually to form a composite material) and a second adsorbing material may be disposed radially with respect to the air flow.

In any case, the radial arrangement of at least part of said at least one adsorbing material allows reducing the negative effects of the action of the electric field and of the photocatalyst, as well as the concentration of polluting substances in gaseous phase.

According to a preferred embodiment, said adsorbing material consists in a plurality of walls (filters) of adsorbing material, disposed radially with respect to the direction of the air flow introduced in the device.

According to an embodiment of the present invention, said walls (filters) of adsorbing material are preferably positioned before the outlet holes; in other words, the filters of adsorbing materials are positioned in parallel direction to the air flow.

The aforementioned arrangement of the filters allows for moving the air flow inside the chamber of the device, facilitating the purification process while limiting the pressure loss.

Preferably, the means for generating an electric field, the photocatalytic material and the filters made of adsorbing material are positioned inside the device chamber one in proximity to the other, preferably on the side of the empty body inside the chamber opposite to the side provided with inlet holes.

According to different embodiments of the present invention, the movement of the air flow (or of the air flows) can be mechanical and/or non-mechanical. The movement of the air flow inside the device can be mechanically obtained by means of a fan. In any case, the device can be devoid of mechanical movement when positioned in special locations, where a movement of the air flow is already provided (for example such as in HVAC conduits or when integrated in fancoils).

According to a preferred embodiment, the walls (filters) of adsorbing material inside the chamber of the device are in contact with the lateral walls of the empty body, defining the spaces between walls. Preferably, the outlet holes to let the air out are provided on the lateral walls of the empty body of the device of the invention, in correspondence of the spaces defined by the walls (filters) of adsorbing material.

Preferably, at least one adsorbing material according to the present invention comprises active carbon.

An additional object of the present invention for purifying the air from pollutants comprises the following steps:
  a) electrostatic precipitation of said pollutants by means of an electric field,
  b) photocatalysis of said pollutants by means of at least one photocatalyst,
  c) adsorption of said pollutants on at least one adsorbing material, wherein the operations that are carried out during steps a), b), and
  c) are carried out in such manner to cooperate.

As mentioned above, the simultaneous combined use of electrostatic precipitation, photocatalysis and adsorption produces a surprisingly synergetic effect because the three techniques mutually interact, increasing their efficacy.

The short distance and the peculiar "in parallel" arrangement inside the chamber of the device of the elements that permit the implementation of the electrostatic precipitation, of the photocatalysis, and of the adsorption, in addition to permitting the direct interaction between the three technologies, are such that the air contained inside the chamber of the device will be simultaneously subject to electrostatic precipitation, photocatalysis and adsorption, at least for part of its permanence inside the chamber. Preferably, the air contained inside the chamber of the device will be simultaneously in contact with the means for generating the electric field, the photocatalyst and the adsorbing material, at least for part of its permanence inside the chamber.

According to a preferred embodiment of the process according to the present invention, the steps a), b), and c) take place simultaneously.

Otherwise said, the implementation of the three processes of electrostatic precipitation, photocatalysis and adsorption takes place in a single air purification step.

Preferably, the process of the invention, which additionally comprises an additional step d) for regenerating said at least one adsorbing material, wherein said step d) takes place simultaneously with steps a), b), and c) and/or additionally comprising a step e) for reducing the ozone, wherein said step e) takes place simultaneously with steps a), b) and c), or simultaneously with steps a), b), c), and d).

As already mentioned, an adsorbing material, for example active carbon, is the capacity of trapping and holding the pollutants particles. However, the pollutants adsorbed by the active carbons must be removed, in order to regenerate the active carbon and make it usable again.

Because of the interaction of the different technologies contained in the device of the invention, the regeneration of the adsorbing material, for example active carbon, can be preferably and advantageously carried out simultaneously with the air purification process (or filtering).

In particular, the electrofilter increases the adsorption efficiency on active carbon, whereas the photocatalysis oxides the pollutants adsorbed on the active carbon and regenerate it.

Similarly, because of the interaction of the different technologies contained in the device of the invention, also the removal of the ozone produced by the electrofiltration process (i.e. by the electrostatic precipitation) can be preferably and advantageously carried out simultaneously (i.e. "in continuous") with the air purification process. In fact, the ozone produced by the electroprecipitation process can be adsorbed by the adsorbing material, for example active carbon, and can be simultaneously reduced photocatalytically by the photocatalyst. The photocatalytic process can take place both at the level of the ozone contained in the air and of the ozone adsorbed by the active carbon filters.

The present invention is characterized by several advantages when compared to the prior art.

The invention takes advantage of the combined synergetic effect of different physical-chemical processes (photocatalysis, adsorption, electrostatic precipitation) inside a single reactor, benefiting from the augmented interaction between said processes, boosting their advantages and eliminating their defects.

In fact, the use of different techniques (i.e. photocatalysis, adsorption and electrostatic precipitation) that operate simultaneously, and not sequentially, in the air purification process, creates a synergetic cooperation of the three methodologies that operate synergistically not only directly on the air, but also mutually one with respect to the other.

In particular, the preferred configuration of the elements inside the chamber of the device is such to make the three technologies cooperate actively to improve the air purification general results.

Specifically, for example, the synergetic effect of an electric field induced on the heterogeneous photocatalysis increases the efficiency of the catalytic process, reduces the generation of ozone by the electrofilter because of the photocatalysis using, for example, TiO2, and generates "activated" chemical species, confining them inside the device thanks to the increase of the adsorbing properties caused by the synergy between the processes.

In addition to these advantages, the association of heterogeneous photocatalysis and of an electric field induced on an adsorbing material, for example active carbon, generates an increased interaction, typically with pollutants preferably in gaseous or vapor phase, and an increment of the adsorbing capacity of the adsorbing material and the regeneration of the material thanks to the oxidation provided by the photocatalysis.

Therefore, the present invention discloses a device and a process wherein the synergetic use of three air purification techniques, i.e. photocatalysis, adsorption and electrostatic precipitation, gives several advantages compared to the prior art.

The capacity and the life of the adsorbing material are increased by the regeneration action obtained locally by oxidation reactions induced by the electric field and by the photocatalytic action.

Moreover, the reaction intermediates of the photocatalytic oxidation are adsorbed by the adsorbing material, and the ozone generation produced by the electric field is destroyed by the combined action of the photocatalytic material and by the active carbon.

Moreover, with reference to the preferred disposition of the elements inside the chamber of the device, it is possible to indicate an additional advantage given by the "electric" movement of the pollutants flow. In fact, whereas the flow of the carrier (air to be purified) is parallel to the adsorbing surfaces, therefore not causing resistance to its movement, because of the action of the electric field applied, the flow of the pollutants is perpendicular to the adsorbing surface, thus improving the efficiency of removal by adsorption, without adding pressure loss, that is to say resistance, to the passage of the carrier air flow. In this way, the movement of the air flow is such that less energy is consumed and less interference is produced (noise, vibrations).

BRIEF DESCRIPTION OF DRAWINGS

Additional features and advantages of the present invention will be more evident from the following description, which has a merely illustrative, not limiting purpose, with reference to the following diagrammatic drawings, wherein.

EMBODIMENTS OF THE INVENTION

Figure 1:
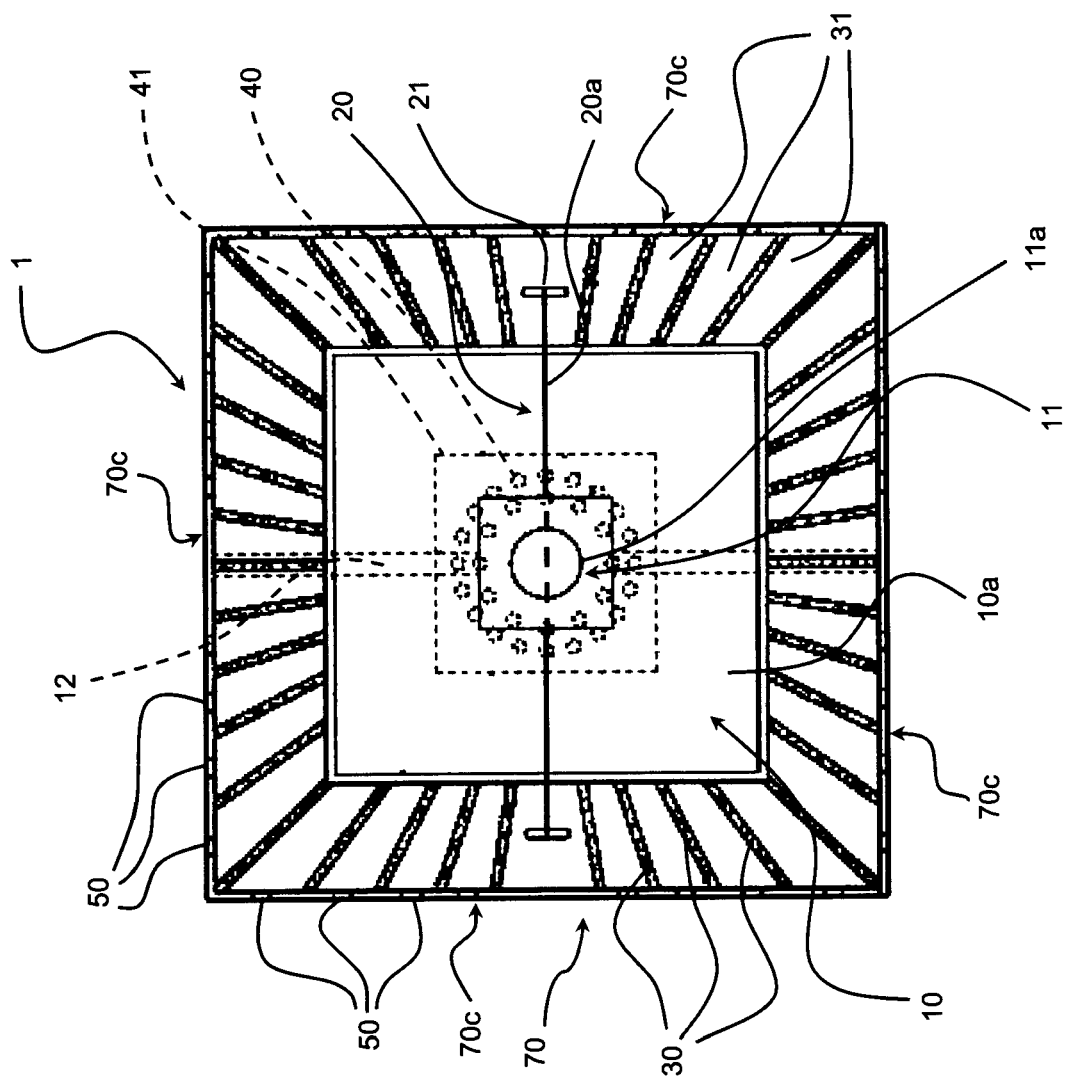
FIG. 1 is a plan view of a possible embodiment of the device according to the invention (the device of FIG. 1 is seen from the side from which air is introduced in the device)

FIG. 1 shows an air purification device 1 according to the present invention.

Said device 1 is formed of an empty body 70 that defines a chamber 60 (see for example FIG. 2) suitable for receiving an air flow to be purified.

According to an embodiment of the present invention, the empty body of the device comprises a horizontal "upper" side (that is to say a wall) 70a and a horizontal "lower" side 70b parallel to the horizontal "upper" side. The empty body also comprises a "lateral" side 70c, for example in the case of an empty body having a substantially cylindrical shape, or can comprise more than one lateral side to form an empty prismatic body. The at least one lateral side (wall) is substantially perpendicular to the two horizontal sides, and suitable for connecting said horizontal "upper" and "lower" sides. According to a possible embodiment, such as the one shown for example in the attached figures, the empty body 70 is shaped as a parallelepiped having two parallel upper and lower sides (walls) 70a, 70b and four lateral sides (walls) 70c.

Specifically, according to the embodiment shown in the figures, the empty body 70 comprises four lateral walls 70c that extend between the two upper and lower walls 70a, 70b with square shape.

As mentioned above, the shape of the empty body 70 of the device is not limited to this embodiment. In fact, other shapes of the empty body 70 are possible, for example, a prismatic and a cylindrical shape, on condition that a chamber is formed inside the empty body, preferably a single chamber intended to receive the air flow to be purified.

As illustrated in detail below, one of the two horizontal sides, such as for example the "upper" side 70a, is provided with at least one inlet hole 40, preferably a plurality of inlet holes that let the air to be purified in.

According to a preferred embodiment of the present invention, such an "upper" side is provided with a fan 41, or similar means for forcedly introducing air inside the empty body, which is preferably positioned inside the chamber, and more preferably inside the chamber in correspondence of the inlet holes of the air. Therefore, air can be introduced in the device thanks to the fan, which generates an incoming air flow.

Figure 2:
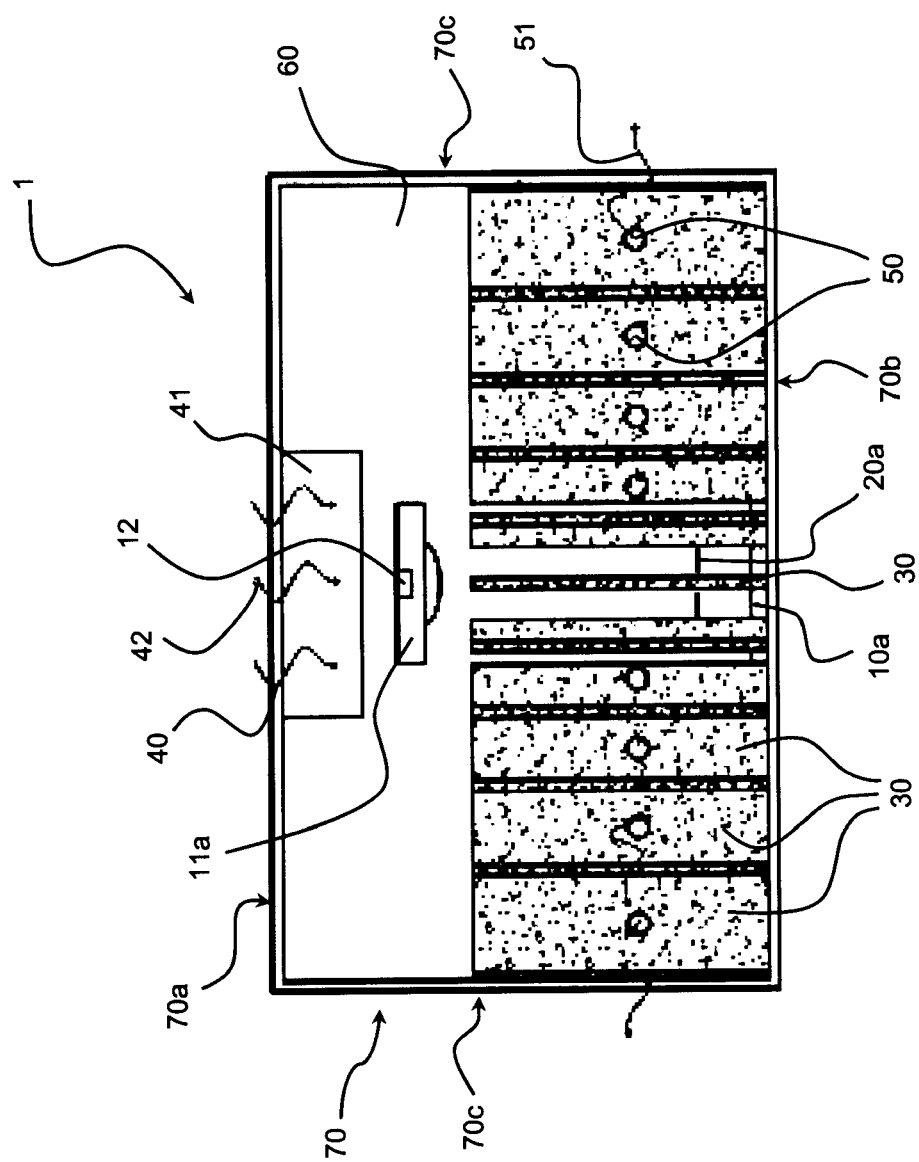
FIG. 2 is a side view of the same embodiment of the device according to the invention shown in FIG. 1 (the device is seen orthogonally with respect to the discharge electrode (a wire in this case))
Figure 3:
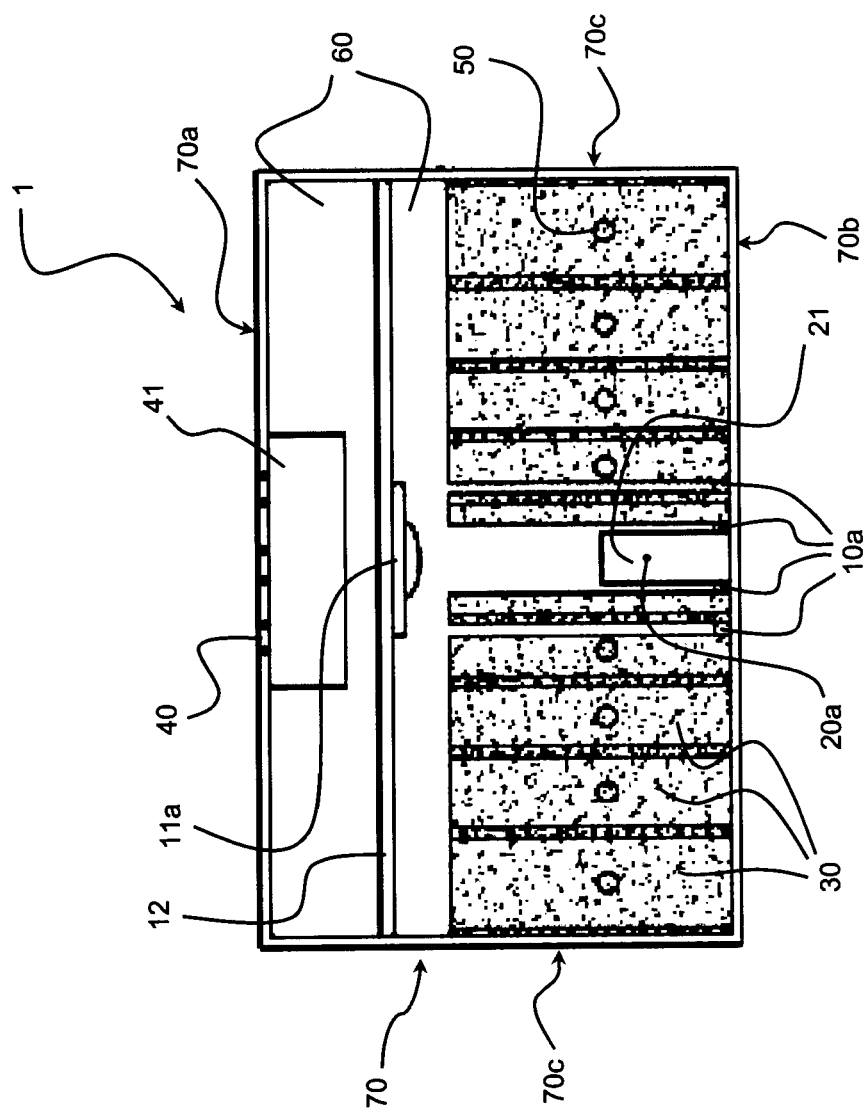
FIG. 3 is a second side view of the same embodiment of the device according to the invention shown in FIG. 1 and in FIG. 2 (the device is seen in parallel direction with respect to the discharge electrode (a wire in this case))

Specifically, as shown in FIGS. 1-3, the air flow to be purified is generated by extracting the air with a fan 41 from the space and is introduced in the device 1 from suitable inlet holes 40 obtained on the side 70a of the empty body 70 of the device 1 where the fan 41 is provided.

According to a preferred embodiment, at least one lateral side (wall), preferably all lateral sides, of the empty body of the device have at least one outlet hole 50, preferably a plurality of outlet holes that let the air out.

In view of the above, the air is introduced in the device according to an incoming air flow, which is substantially perpendicular to the two upper and lower sides 70a, 70b, and comes out of the device through the outlet holes 50, from the lateral walls 70c, according to one or more outgoing flows; said outgoing flows being substantially perpendicular, preferably perpendicular and radial, with respect to the incoming flow.

Means for generating an electric field 20, a photocatalyst 10, a luminous radiation source 11 and an adsorbing material 11 are provided inside the device 1.

In particular, according to the embodiment of FIG. 1, the means for generating an electric field 20 comprise a metal wire 20a that passes through the chamber inside the device 1 and is tensioned between two supports 21. Said metal wire 20a acts as discharge electrode for actuating the electrofiltration process (that is to say electrostatic precipitation) of the air introduced in the device 1.

Although not shown in the figures, the device comprises a suitable power supply to supply the necessary voltage to the metal wire.

According to the embodiment shown in FIG. 1, the metal wire 20a (that is to say the discharge electrode) is positioned between a luminous radiation source 11 and the photocatalyst 10.

FIG. 1 shows an embodiment wherein the luminous radiation source 11 is a UV lamp 11a that is maintained in position inside the chamber by the support means 12. According to a possible embodiment, the photocatalyst comprises a composite material 10a with photocatalytic and adsorbing properties. Specifically, according to a possible embodiment, the photocatalyst 10 is a sheet of composite material 10a comprising a photocatalytic material (for example titanium dioxide TiO2) applied on at least part of an adsorbing material (for example active carbon).

As mentioned above, according to a possible embodiment, the device comprises a conductive material. For example, the photocatalyst 10 may comprise a composite material with conductive properties.

It must be noted that a photocatalyst material can be applied on the conductive material (for example graphite) and/or on an adsorbing material.

According to a possible embodiment, the photocatalyst 10 comprising a composite material with photocatalytic, adsorbing and conductive properties (diagrammatically indicated in the figures with reference 10a) can correspond to the collecting electrode for the electrofiltration process.

As known, although not shown in the attached figures, also the collecting electrode is suitably connected to the power supply that provides the necessary voltage to generate a potential difference between the two (discharge and collecting) electrodes. According to other embodiments, if the photocatalyst has no conductive properties, the composite material with adsorbing and photocatalytic properties can be positioned on an electrode, for example a plate of metallic material acting as electrode.

An adsorbing material 30 can be seen in the embodiment of FIG. 1; in particular, a plurality of walls (filters) of adsorbing material 30 can be seen, which are disposed radially with respect to the direction of the air flow introduced in the device 1.

Specifically, such an adsorbing material 30 is disposed radially with respect to the axis that perpendicularly intercepts the two horizontal upper and lower sides of the device 1; according to the embodiment shown in FIG. 1, such an axis is orthogonal to the metal wire 20a and to the plane whereon the plate of adsorbing, photocatalytic and conductive material 10a is placed.

Such a plurality of walls (filters) of adsorbing material 30 defines a plurality of spaces 31 inside the chamber of the device 1, which are intended to convey the air flow between the walls of adsorbing material 30. Then the air flow comes out of the device 1 passing through the outlet holes 50 provided on the lateral walls 70c of the empty body 70 of the device 1. According to a possible embodiment, as shown in the attached figures, the walls (filters) of adsorbing material are disposed in such manner to be perpendicular to the upper and lower sides (walls) 70a, 70b.

According to the embodiment of FIG. 1, the lateral walls 70c are disposed in orthogonal position with respect to the side of the empty body 70 of the device 1 whereon the fan 41 is provided, that is to say with respect to the side of the empty body from which the air flow is introduced. According to the embodiment of FIG. 1, the outlet holes 50 are provided on the lateral walls 70c of the empty body 70 of the device 1, in correspondence of the spaces 31 defined by the walls of adsorbing material 30.

As illustrated above, the air to be purified is extracted with a fan 41 from the space and is introduced in the device 1 from suitable inlet holes 40 obtained on the side (wall) 70a of the empty body 70 of the device 1 whereon the fan 41 is provided.

The air flow is conveyed towards the photocatalyst, and in particular towards the adsorbing, photocatalytic and conductive material 10a, which is subject both to the electric field generated by the metal wire 20a (whereon an electric potential is applied), and to the UV light coming from the UV lamp UV 11a.

As mentioned above, according to a possible embodiment, the adsorbing, photocatalytic and conductive material 10a corresponds to the collecting electrode of an electrofilter (whose discharge electrode is the metal wire 20a).

In this way, the electric field generated by the electrodes (i.e. in this case the metal wire 20a and the adsorbing, photocatalytic and conductive material 10a) induces the collection of pollutants on the adsorbing, photocatalytic and conductive material 10a. The presence of the electrofilter generates ozone and increments the removal of the pollutants. The photocatalysis process by the adsorbing, photocatalytic and conductive material 10a, which is activated by means of a UV lamp 11a, oxides the pollutants (moreover, titanium dioxide (TiO2) also reduces the presence of the ozone), partially regenerating the adsorbing, photocatalytic and conductive material 10a.

The adsorbing material 30, disposed radially to the adsorbing, photocatalytic and conductive material 10a, holds and confines the primary and secondary pollutants inside the device 1. Outlet holes 50 are provided on the lateral walls of the empty body 70 to let the purified air out.

FIG. 2 shows a side view of the device 1 of the invention shown in FIG. 1. The device 1 is seen laterally, orthogonally with respect to the metal wire 20a that represents the discharge electrode of the electrofilter.

FIG. 2 shows the chamber 60, which is intended to receive an air flow to be purified, defined by the empty body 70 of the device 1.

As mentioned above, the incoming air flow 42 is generated by extracting the air with a fan 41 from the space and is introduced in the chamber 60 from suitable inlet holes 40 obtained on the side 70a of the empty body 70 of the device 1 whereon the fan 41 is provided.

With reference to FIG. 2, the chamber 60 contains a UV lamp 11a with relevant support means 12, a portion of the plate of adsorbing, photocatalytic and conductive material 10a; moreover, a portion of the metal wire 20a (that is to say the discharge electrode of the electrofilter) is disposed in intermediate position between these parts.

FIG. 2 also shows the plurality of walls of adsorbing material 30; said walls are disposed in radial direction with respect to the incoming air flow 42. The side view of the device 1 shows the radial position of the walls (filters) of adsorbing material 30.

For the sake of clarity, FIG. 2 shows the outlet holes 50 to let the purified air out, which are obtained on the lateral walls 70c of the device, in correspondence with the spaces between two walls of adsorbing material 30.

FIG. 2 diagrammatically shows the outgoing air flow 51 that comes out from the holes 50 on the side walls of the empty body 70 of the device 1 of the invention.

In such an embodiment, the air flow that is purified inside the device 1 comes out from the device with an orthogonal and radial direction with respect to the incoming direction.

FIG. 3 shows a second side view of the same embodiment of the device 1 according to the invention shown in FIG. 1 and in FIG. 2. The device is seen in parallel direction with respect to the metal wire 20a that forms the discharge electrode (for the implementation of the electrostatic precipitation process).

Also FIG. 3 shows the chamber 60, which is intended to receive an air flow to be purified, defined by the empty body 70 of the device 1.

The same figure also shows the fan 41 and the inlet holes 40 to introduce the air inside the chamber 60 of the device 1.

The chamber 60 contains the UVA lamp 11a with relevant support means 12, the plate of adsorbing, photocatalytic and conductive material 10a (of which only small portions are visible in FIG. 3) and the metal wire 20a (that is to say the discharge electrode of the electrofilter) disposed in intermediate position between the UV lamp 11a and the plate of adsorbing, photocatalytic and conductive material 10a. The metal wire 20a passes through the chamber inside the device 1, being tensioned between the two supports 21 (only one support 21 is visible). The metal wire 20a is shown as a point because of the point of observation in lateral parallel position to the metal wire 20a.

A plurality of walls of adsorbing material 30 is disposed radially with respect to the direction of the incoming air flow 42, not shown in FIG. 3.

As shown in FIG. 2, for the sake of clarity, also FIG. 3 indicates the outlet holes 50 that are used to let the purified air out. The outlet holes 50 are obtained on the lateral walls (sides) of the device, in correspondence of the spaces 31 (not shown in FIG. 3) between two walls of adsorbing material 30.

According to the embodiment of the device 1 of the invention, as shown in FIGS. 1, 2 and 3, the outlet holes 50 used to let the purified air out are provided on the four lateral walls 70c of the device 1. However, other configurations are possible.

In conclusion, in the device 1 and in the process according to the present invention, a fan 41 or similar means for forcedly introducing the air inside the device generates an air flow that is introduced in the chamber 60 defined by the empty body 70 of the device through the inlet holes 40.

The air flow reaches the photocatalyst and in particular the adsorbing, photocatalytic and conductive material 10a. In such a case, the adsorbing, photocatalytic and conductive material corresponds to the collecting electrode of an electrofilter, so that the electric field induces the collection of pollutants on said adsorbing, photocatalytic and conductive material and on the walls of adsorbing material.

As mentioned earlier, the discharge electrode of the electrofilter is, for instance, a metal wire 20°.

The presence of the electrofilter generates ozone and increments the elimination of pollutants. The photocatalysis process by the photocatalyst, which is activated by means of a suitable luminous source, for example, a UV lamp 11a, oxides the pollutants, at least partially regenerating the adsorbing, photocatalytic and conductive material, and the walls (filters) of adsorbing material (for example composed of active carbon).

Preferably, the adsorbing, photocatalytic and conductive material 10a reduces the presence of the ozone generated by the action of the electric field. The adsorbing material 30, for example of the active carbon walls, encloses the primary pollutants (the pollutants that are introduced directly in the space because of the process that produced them) and the secondary pollutants (that is to say by-products of the reactions that take place on the primary pollutants) inside the device.

Figure 4:
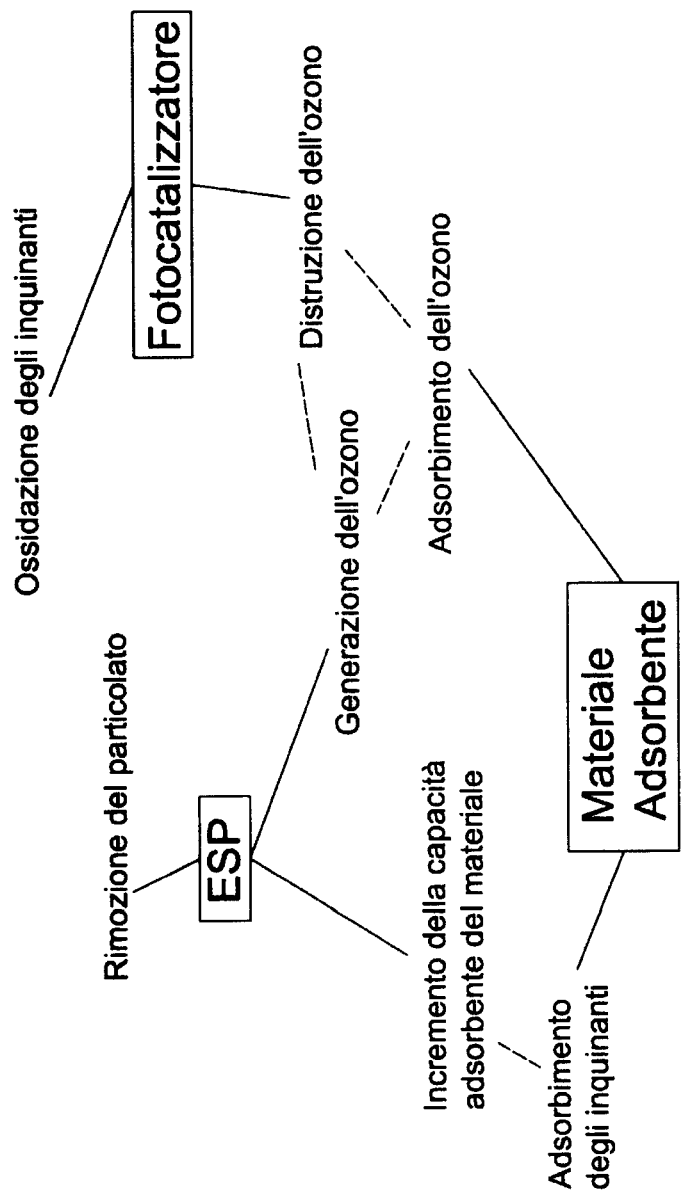
FIG. 4 is a diagrammatic drawing of the synergetic connections between the different purification techniques obtained by means of the device and the process of the invention.

FIG. 4 diagrammatically shows the synergetic connections between the different techniques implemented by the device of the invention.

The three blocks, which are indicated as "ESP", "Photocatalyst" and "Adsorbing Material", diagrammatically indicate the three purification techniques used simultaneously according to the invention, that is to say the electrostatic precipitation ("ESP" block), the photocatalysis ("Photocatalyst") and the adsorption ("Adsorbing Material").

The continuous lines indicate the effects of the single techniques, whereas the broken lines represent the connections created between the effects of the different techniques, diagrammatically showing how each of the electrostatic precipitation ("ESP"), the photocatalysis ("Photocatalyst") and the adsorption ("Adsorbing Material") has some effects that synergistically interact with the effects of the other techniques.

For example, in FIG. 4 the effects of electrostatic precipitation ("ESP") are summarized in: elimination of particulate, increment of the adsorbing capacity of the material (that is to say of the adsorbing material) and ozone generation.

The effects of photocatalysis ("Photocatalyst") are summarized in: oxidation of pollutants and destruction of the ozone.

The effects of the third technique, that is to say adsorption ("Adsorbing Material"), are summarized in: adsorption of the pollutants and adsorption of the ozone.

As shown in the diagram, the capacity of the adsorbing material to adsorb pollutants is incremented by the effects of the electric field used in the electrostatic precipitation. The electric field generates ozone inside the air treated with the electrostatic precipitation (electrofiltration) that is simultaneously destroyed by the photocatalytic action of the photocatalyst and/or adsorbed by the adsorbing material. It must be noted that the photocatalytic action can be also implemented at the level of the ozone already adsorbed by the adsorbing material.

The interactions indicated in the diagram of FIG. 4 are only some of the several synergetic interactions that occur between the three techniques used in the invention.

For example, the additional effects of the application of an electric field to the photocatalysis (specifically heterogeneous photocatalysis) are: increased efficiency of the catalytic process, generation of "activated" chemical species, and their confinement inside the device of the invention thanks to the adsorbing properties, which are in turn increased by the synergies between the processes.

Moreover, the association of the photocatalysis (in particular heterogeneous photocatalysis) and of an electric field induced on a solid adsorbing material generates an interaction with a higher adsorbing capacity of the material, regenerating the adsorbing material thanks to the oxidation of the pollutants that are present at adsorbing material level caused by the photocatalysis.

The invention claimed is:

1. An apparatus for purifying air from pollutants, the apparatus comprising:
at least one empty body defining a chamber adapted to receive an air flow to be purified, the at least one empty body having at least one inlet hole and at least one outlet hole for the air flow, the chamber comprising:
an electric field generator internal of the chamber;
a luminous radiation source internal of the chamber;
a photocatalyst adapted to be excited by luminous radiation from said luminous radiation source so as to cause photocatalysis;
a plurality of walls formed of an absorbent material, each of said plurality of walls lying on a plane, wherein said electric field generator and said photocatalyst and said plurality of walls are cooperative with each other internal of the chamber, wherein said plurality of walls are disposed radially around said photocatalyst such that the planes of said plurality of walls converge toward said photocatalyst, said plurality of walls defining a plurality of spaces within the chamber, the at least one inlet hole and the at least one outlet hole being arranged such that the air flow enters the chamber in correspondence to the convergence of the planes of said plurality of walls and passes through the plurality of plurality of spaces and passes outward of the at least one empty body through the at least one outlet hole.

2. The apparatus of claim 1, wherein said photocatalyst comprises a composite material having a photocatalytic material applied on at least a portion of an adsorbing material of said photocatalyst.

3. The apparatus of claim 1, wherein said photocatalyst is disposed on at least one conductive element.

4. The apparatus of claim 1, wherein said electric field generator comprises a first electrode and a second electrode, said photocatalyst being disposed on at least one of the first and second electrodes.

5. The apparatus of claim 1, wherein at least a portion of said plurality of walls comprises activated carbon.

* * * * *